Feb. 28, 1950     R. F. WEHRLIN     2,499,238
ERECTING SYSTEM FOR GYROSCOPES
Filed Sept. 8, 1944
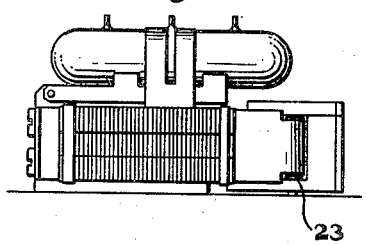
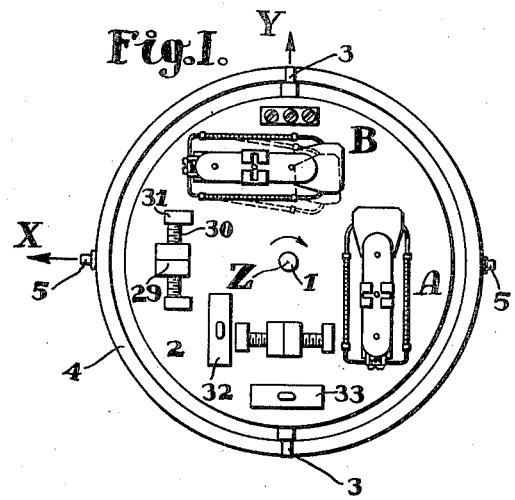
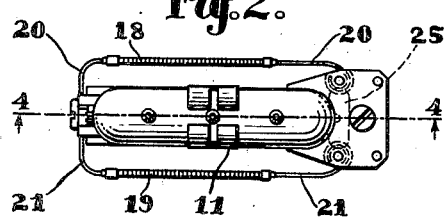
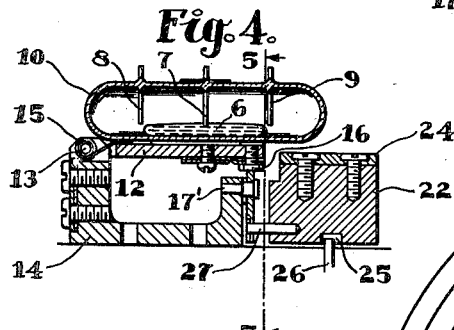
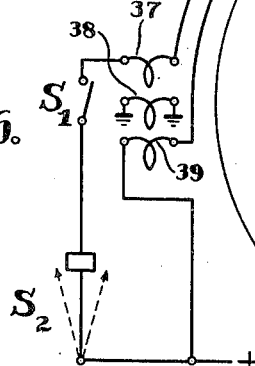
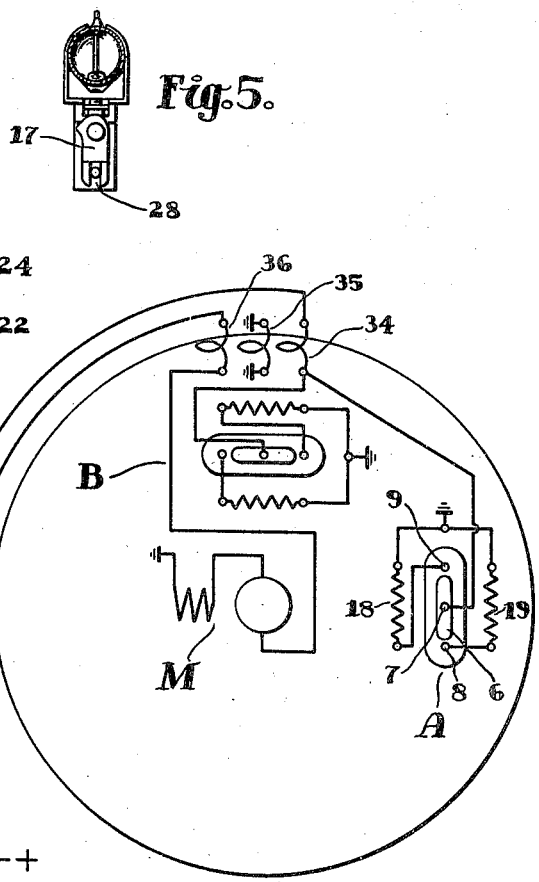
Inventor
Richard F. Wehrlin
By *Sauja & Kennedy*
Attorneys Patented Feb. 28, 1950

2,499,238

UNITED STATES PATENT OFFICE 2,499,238

ERECTING SYSTEM FOR GYROSCOPES

Richard F. Wehrlin, New York, N. Y., assignor, by mesne assignments, to The Norden Laboratories Corporation, White Plains, N. Y., a corporation of Connecticut Application September 8, 1944, Serial No. 553,275

8 Claims. (Cl. 74—5.44)

This invention relates to improvements in erecting systems for gyroscopes.

It is an object of the invention to provide an auto-erecting system of simple and compact character.

A second object of the invention is to provide compact, light-weight, auto-erecting units suitable for use with existing gyroscopes without requiring extensive modification or adaptation of such gyroscopes.

Another object of the invention is to provide an auto-erecting system in which loss of sensitivity because of damping of the system is avoided.

A further object of the invention is to provide a system in which a highly sensitive undamped inclinometer may be employed and indicated lateral acceleration may be introduced into the torque system in the form of stored energy, the net stored energy being utilized to actuate the gyro.

A further object of the invention is to provide an auto-erecting system which will, when cut out, continue to apply proper precession for a time.

Still another object of the invention is to provide an erecting system in which the frequency of torque fluctuation is controlled so as to be unobjectionable.

With these and other objects which will appear in the following full description in mind, the invention consists in the combinations and arrangements of parts and details of construction which will now first be fully described in connection with the accompanying drawing, and then pointed out more particularly in the appended claims.

In the drawing:

Figure 1 is a plan view of a vertical gyro unit with erecting units mounted thereon;

Figure 2 is a plan view on an enlarged scale of one of the erecting units of Figure 1;

Figure 3 is a side elevation of the unit of Figure 2;

Figure 4 is a section taken on the line 4—4 of Figure 2;

Figure 5 is a section taken on the line 5—5 of Figure 4; and

Figure 6 is a wiring diagram.

Referring now to Figure 1, there is illustrated a vertical gyro instrument, such as commonly used on aircraft for providing a horizontal reference plane, and for other purposes. The gyro comprises a rotor carried on the shaft 1 in the inner ring of a set of gimbals, also known as Foucault or Cardan's suspension, which inner ring in this case takes the form of a housing 2 for the rotor and drive mechanisms therefor. In the gyro selected for illustration, the rotation of the gyro motor is clockwise as viewed from above, and hence the spin vector Z may be regarded as directed downwardly and extending perpendicularly to the plane of the figure. The inner ring or housing 2 is carried by means of trunnions 3 and anti-friction bearings in the so-called "cardan," or outer ring 4 of the suspension, and the cardan 4, in turn, is provided with trunnions 5 by means of which it is carried in anti-friction bearings in a suitable support, not shown.

The axis of rotation of the housing 2 upon its trunnions 3 is disposed at right angles to that of the cardan 4 upon its trunnions 5, and if these axes be considered as directed in the directions indicated by the arrows Y and X, respectively, the axis of the cardan, axis of the housing and spin vector of the gyroscope, taken in that order, are orientated in the same way as a conventional trirectangular right-handed system of axes.

As is well known, the spin axis Z of such a gyroscope, and hence the housing, will remain fixed in space against rotation unless caused to precess by a torque. When the gyro is constructed so as to be a "neutral" gyro, or one which is balanced about all axes, the only torque present, except as deliberately applied, is that due to unavoidable bearing friction in the gimbals and to the flexible electric leads running from housing 2 to the cardan 4 and from the cardan 4 to its support. Accordingly, such a gyro, when set with its spin axis vertical, will exhibit an apparent rotation about an axis normal to the spin axis, and hence will not remain vertical. Such apparent rotation amounts at the equator to one-quarter of a degree per minute, neglecting bearing friction and the effect of the flexible leads, and when these factors are taken into account, the resultant torque about the axis of apparent rotation will also introduce a slight precession obout an axis at right angles thereto. Where the gyro is mounted on a moving body such, for example, as an aircraft in unaccelerated flight, this effect will be enhanced or reduced depending on the course followed. One purpose of auto-erecting systems is to eliminate this apparent rotation, suitable torque being applied to the gyro to cause it to precess in such a manner as to remain vertical or return to vertical when slightly displaced therefrom. A second purpose is to provide for accurate setting of the gyro, as for example, on a bombing run, since the auto-erecting system permits the operator to erect the gyro quickly by placing it approximately vertical, and the system then completes the setting.

Inasmuch, however, as all known practical mechanisms for indicating the vertical are affected by lateral accelerations as well as by the force of gravity, provision is necessary for preventing undue interference from such accelerations.

In the system of the present invention, two stabilizer units are provided, for stabilizing in two vertical planes, as shown in Figure 1. Each unit comprises a tilt indicator, or inclinometer, which conveniently takes the form of a mercury switch, in which the mercury 6 establishes contact between a central contact 7 and either of two side contacts 8 and 9, according to direction of tilt. The inclinometer is preferably sensitive to very small tilt and is undamped, the contact means, such as the mercury 6, being free to move back and forth as the inclinometer tilts. It is also preferred that the mercury or other contact element should be in neutral equilibrium so that no substantial rise or fall of its center of gravity is involved in its motion in making contact with the contacts 8 and 9. The mercury and contacts are enclosed in an envelope or bulb 10, normally of glass, which is mounted by a clip 11 on an arm 12 pivotally supported at 13 by a frame member 14 which is fastened on the gyro housing 2. The mercury switch is biased downwardly by a spring 15 and supported through an adjustable stud or projection 16 by a cam member 17. Cam member 17 together with other apparatus described below form a follow-up system between the tilt indicator and torque control, by means of which the tilt indicator is maintained level so as to be able to exert control in both directions.

Since the inclinometer cannot distinguish between the acceleration of gravity and acceleration due to movement of an aircraft or other location in which the gyro may be used, it will respond to tilt out of apparent level, or position at right angles to the resultant of all accelerations, and the follow-up system will maintain the inclinometer in apparent level position. Where there are no lateral accelerations, the apparent level will coincide with the actual level.

In the manner described below the inclinometer is used to control a torque applying means, by controlling the supply of energy to actuating means which store the energy so supplied and vary the applied torque according to the quantity of energy applied over an interval of time. Because of this characteristic, the action of the undamped and highly sensitive inclinometer will not affect the gyro with rapid oscillatory torque pulses, but the torque is varied smoothly. In the embodiment illustrated, the inclinometer, being an electric switch, controls energy in the form of electric current, supplying it to one or the other of two sets of heaters and bimetallic strips, where it is temporarily stored as heat, and utilized to move a torque weight, the opposed thermo-responsive strips displacing the weight according to the net effect of the current supplied to them.

The mercury switch, according to whether connection is established with contact 8 or contact 9, will cause current to flow through heater winding 18 or heater winding 19, respectively surrounding the bimetallic strips 20 and 21, which are fastened at one end to the frame member 14 and which carry a weight 22, slidable over the housing 2 so as to produce an adjustable torque.

The bimetallic strips are conveniently connected to the weight 22 by turning their ends around rollers 23 accommodated in recesses formed in the weight 22. The rollers 23 are pivotally supported at top and bottom and may be inserted or removed by removing cover plate 24 of the weight 22. The bottom of weight 22 is grooved as at 25 to receive a stud 26 which is fastened to the housing 2 and serves as a stop for limiting movement of the weight. Heating either of the bimetallic strips 20 and 21 will cause it to arch inwardly toward the center of the unit and hence to move the weight 22 to one side or the other, the extent and direction of displacement depending upon the temperature difference between the bimetallic strips.

Weight 22 carries a pin 27 which rides in a slot 28 formed in the cam member 17 previously referred to. Cam member 17 is pivotally mounted on frame member 14 at 17' and its upper cam surface is formed so as to raise the mercury switch arm 12 when moved to one side of the centered position of Figure 5 and to lower the arm 12 when moved to the other side, providing a follow-up system. Accordingly, if the gyro is tilted so as to establish contact of the mercury switch in one direction, the heater for one of the bimetallic strips will be energized, causing the weight to move so as to produce a torque tending to precess the gyro toward vertical or apparent vertical. This movement of the weight, through cam member 17, will tend to restore the mercury switch to a level or apparent level position so that in a short while a condition is reached in which the gyro is still tilted, the weight has been moved to produce the required torque and the mercury switch is level, so that the action of the weight is controlled by the bimetallic strips in both directions, and as the gyro returns to vertical the weight is moved so as to reduce the torque and the mercury switch is turned back so as to be level when the gyro is again vertical.

Two such stabilizing units are employed, being identified as A and B in Figure 1 of the drawing, and being placed with their center lines in planes normal to the axes X and Y, respectively. For definiteness, the axis X may be supposed to extend athwartship of the aircraft and the axis Y to extend fore and aft. The units are balanced by a pair of nuts 29 carried on threaded rods 30 in supports 31 on the housing 2 and disposed for movement in lines which are preferably at right angles. As will be understood, the gyro housing is balanced above and below so that the stabilizer units and adjusting weights therefor when in neutral position exert no torque. The usual spirit levels 32 and 33 for indicating gyro balance are provided and are utilized in setting the gyro, the operator employing any of the usual manual means (not shown) for precessing the gyro into vertical position.

In view of the foregoing description, the wiring diagram of Figure 6 is largely self-explanatory. Current is supplied from the "hot" connection indicated as "+" through connection 39 to a connecting line on the cardan and thence through flexible connection 36 to a line on the housing 2, and passes through the gyro motor identified by the letter M to ground. Common ground connection for the housing 2 and cardan 4 with the aircraft electrical system is maintained by flexible connections 35 and 38. Similarly, current is supplied for the stabilizer units through flexible connections 37 and 34, but this line includes the control switch $S_1$, by means of which the self erecting system may be thrown out of operation, and also the usual switch S₂, which operates to throw the system out of operation during aircraft turns through angles exceeding a certain value.

While the stabilizer units A and B have been shown as employed for both axes, it will be understood that one such unit may be employed for one axis together with another stabilizing means for the other axis, and that the stabilizing system may be employed in conjunction with other stabilizing means, where desired. Also, while the erecting system has been shown as applied to a gyro whose rotor is the armature of an electric motor it is also applicable to gyros generally, including those in which the gyro rotor is driven by air or other means.

*Operation*

The system of the invention possesses a number of novel characteristics, which will best be understood by a comparison with certain known systems. Such known systems include: (a) servomotor systems in which an inclinometer, generally an inverted pendulum switch, clutches in a drive in one direction or the other for moving a weight to create a torque; (b) vane systems, utilized generally with air driven gyros, in which pendulum vanes register inclination and by opening or closing air ports generate the desired torque; (c) solenoid systems in which the inclinometer, generally in the form of a mercury switch, energize a solenoid, the plunger of which applies the torque; and (d) "bail" systems in which a bail swingably carried on one of the horizontal axes presses against a roller on the rotor shaft, the frictional contact with this moving member producing the torque.

The primary purpose of the erecting system, depending on the field of use, is either to counteract the apparent rotation of the gyro produced by the earth's rotation or to assist the operator in erecting the gyro. In most installations both uses are important.

Supposing the gyro to be vertical and stationary on the earth's surface, rotation of the earth on its axis will produce an apparent tilting of the gyro, generally about an axis having components in both the X and Y directions. Since, however, the component rotations may be considered separately, a rotation about only one axis, such as the Y axis, may be considered without loss of generality. As soon as a very slight tilt has been produced, mercury switch B will make contact with either its contact 8 or its contact 9, and produce a corresponding displacement of its weight 22, transversely of the plane of tilt of the switch. Thus, for example, if the apparent rotation is in the sense represented by the arrow Y in the drawing, considered as a vector, contact will be established with contact 9 of the unit B, thus energizing heater winding 18 of bimetallic strip 20 and causing an inward movement of the weight 22, toward the dotted line position of Figure 1. The resulting unbalance creates a torque about the axis X, represented by a vector in the direction opposite to the arrow X in the figure, and causes, in accordance with the known rule, a precession which tilts the spin axis vector Z toward the torque vector. Since, in view of the direction of the spin of the rotor, the spin vector Z is directed downwardly, this precession takes the form of a clockwise rotation when viewed along axis Y in the direction opposite to the arrow. Meanwhile the cam member 17 of the follow-up system will have restored the mercury switch of unit B to level position and as the gyro returns to vertical, contact will be made alternately with contact 8 and contact 9, operating the heaters and bimetallic strips to restore the weight 22 and the mercury switch to vertical position as the gyro also returns to vertical. The situation, where the gyro is in unaccelerated movement in a substantially straight line, as in an aircraft in level flight at constant speed, is not materially different, as the effect of such movement is merely to vary the speed with which the gyro is carried around the earth's axis by the earth's rotation, and hence to vary the amount of apparent rotation.

Under such circumstances, the system of the invention possesses considerable advantages over known systems, principally due to its simplicity and to inherent sensitivity permitted by novel damping characteristics, as discussed below.

In setting the gyro it is necessary only for the operator to place it sufficiently close to vertical so that the system will erect the gyro within a required time. This is accomplished by use of the spirit levels, setting the gyro within a degree or two of vertical, and the system will then erect the gyro to vertical within two or three minutes. The gyro may be considered vertical in practical application, when the tilt is less than a certain amount, generally one-quarter of a degree.

Under normal conditions of gyro use in aircraft, the conditions supposed above are seldom realized, even approximately, for the reason that even in level flight at constant speed there is considerable random acceleration in the form of vibration and in the form of aircraft oscillation and constant control surface adjustment. In the system of the invention, despite this fact, the inclinometer may be made practically instantaneously responsive to infinitesimal apparent inclinations, despite the fact that this involves also continual response to vibration, and other accelerations, the mercury moving rapidly back and forth and alternately making contact with the contacts 8 and 9. This capability results from the fact that a momentary establishment of contact which momentarily energizes one of the heaters will not of itself produce movement of weight 22 due to the lag of the bimetallic strip in heating. Accordingly, under vibration conditions or symmetric oscillation conditions, the momentary contacts established in both directions merely serve to heat the bimetallic strips to corresponding degrees and since the force generated by each strip is counter-balanced by that generated by the other, no displacement of the weight 22 occurs. In other systems, such as the vane system, the damping of the inclinometer itself, with resulting loss of sensitivity, is required to avoid the application of constantly vary torque to the gyro. In the system of the invention an inclinometer of any desired sensitivity may be employed, without damping, and means of storing the impulses given the torque applying system is provided so that it reacts only to the net average effect of the impulses over a given period of time.

Since the system employs a rigid follow-up and a highly sensitive undamped inclinometer is used, the torque weight is balanced about the proper point and will move to and fro through a small distance to each side of this point. This does not affect the proportionality of the torque produced to the tilt of the gyro. The damping of the thermal elements is such that the system may readily be adjusted for a desired period of oscillation of the torque weights. Since a slow oscillation will be followed by the gyro, resulting in instability of its vertical axis, too slow an oscillation is undesirable. On the other hand, too rapid an oscillation will result in the torque weight having an oscillatory period within the frequency range of aircraft vibration, and hence creates a danger of resonance. For these reasons, the erecting unit will be built with a torque weight period of the order of one second, which is well above the aircraft vibration frequencies and is still so rapid that any gyro response is negligible.

In the general case of aircraft flight, the speed in line of flight may vary and the flight path may also be curved. The acceleration may be resolved into the downwardly directed acceleration due to gravity, to which the system is intended to respond, that along the line of flight and due to acceleration in line of flight and an acceleration normal to the line of flight and resulting from curvature of the flight path. Since all known inclinometers will respond, however, to the resultant of all these accelerations and cannot differentiate between the desired acceleration, due to gravity, and the undesired acceleration, due to aircraft movement, certain provisions are necessary to prevent the gyro "walking off" or departing too greatly from the vertical in response to acceleration due to aircraft movement. During turns through angles exceeding a certain value, as is customary, the erecting system is cut out by the automatic switch $S_2$ and, as is also customary, the system is cut out manually by use of the switch $S_1$ during accelerated climb or glide. The remaining accelerations are handled by integrating them, at least approximately, so that in their net effect they may be expected to cancel out. When the balance of successive opposed accelerations is not exact, any error which is not too great will be corrected as soon as straight unaccelerated flight is resumed.

For the successful integration of successive lateral accelerations in opposite directions, it is necessary that the system provide, at least approximately, a torque proportioned to the acceleration so that the precession effect of a given acceleration for a given time will approximately equal that of a lesser acceleration for a corresponding greater time. In the system of the invention this is provided for, since, within the adjustment range, the displacement of the weight and hence the torque will be proportioned to the inclination of the gyro with respect to the resultant of all accelerations. Certain known systems, such as the solenoid system, inherently do not permit of such integration, since the torque applied is constant, and certain other systems do not permit of effective integration of small accelerations, due to the necessary inclinometer damping.

The damping time interval of the erecting system of the invention is controlled without loss of sensitivity. Since inclinometer response is translated into heat communicated to the bimetallic strips and the mechanical response of the strips is a function of temperature, the response of the strips is a function of the rate of electric energy supplied and converted into heat as compared with the rate of heat dissipation. These comparative rates also determine the interval over which the energy is accumulated to determine the response of the torque weight. It has been found that controlled and substantially uniform response may be obtained over a temperature range from −30° F. to +160° F., covering the required range for aircraft use, with fixed radiation conditions, the gyro being provided merely with the usual cover. Where provision for special conditions might require a modification of radiation conditions, modification can readily be made, as, for example, by using suitable heat insulation around the heaters 18 and 19.

The system of the invention also possesses novel integrating characteristics with relation to certain other supposedly proportional systems. For example, the vane system will produce a torque proportional to the inclination of the vanes. However, with such system, a given lateral acceleration will produce a lesser vane inclination when combined with an increase of acceleration in the vertical direction, so that opposite lateral accelerations cannot integrate out, even though equal and operating for equal times, if combined with different vertical accelerations. With the system of the invention, however, a vertical acceleration which reduces the inclination resulting from a given lateral acceleration will also increase correspondingly the torque exerted due to a given displacement of the weights 22, so that the torque change caused by a given change in lateral acceleration may be truly proportional to the lateral acceleration, and the conditions for successful integration and canceling out are fulfilled.

As noted above, the erecting system may be cut out automatically or manually during turns, glides or climbs. In particular, on a bombing run, it may be cut out during the latter part of a bombing run to avoid disturbance of vertical. In other known systems, the gyro immediately commences its apparent rotation out of the vertical due to the earth's rotation and this effect may be considerable in a fairly short time, amounting in some cases to about one-quarter of a degree per minute. With the present system, however, the torque weights 22 will not return immediately to neutral position when the system is cut out, but will move back gradually as the temperature difference between opposed bimetallic strips is dissipated. In this way the correct erecting torque as determined during a level run at constant speed will be partially preserved, gradually decreasing as the strips cool down, and the apparent rotation of the gyro after the system is cut out will be reduced. For usual bombing purposes such preservation of effective torque for fifteen or thirty seconds will be sufficient. As will be apparent to those skilled in the art, the return of the torque weights to neutral position is asymptotic in time.

What is claimed is:

1. A self erecting gyro comprising a gyro rotor, an inner supporting ring therefor, means for rotatably supporting the gyro rotor with its spin axis in a predetermined position with reference to the said inner ring, torque applying means for precessing the gyro to erect the same, actuating means for said torque applying means comprising thermo-responsive means movable to regulate said torque applying means, electric heating means for heating said thermo-responsive means to move the same, inclinometer means for regulating supply of current to said electric heating means according to direction of tilt of said gyro, and a follow-up between said torque applying means and said inclinometer means for maintaining the said inclinometer means in apparent level position.

2. A self erecting gyro comprising a gyro rotor, an inner supporting ring therefor, means for rotatably supporting the gyro rotor with its spin axis in a predetermined position with reference to the said inner ring, torque applying means for precessing the gyro to erect the same, actuating means for said torque applying means comprising opposed thermo-responsive elements for regulating said torque applying means according to the net force exerted by said elements, an electric heater for each said element, inclinometer means for supplying current selectively to the said heaters according to the direction of tilt of said gyro, and a follow-up between said torque applying means and said inclinometer means for maintaining said inclinometer in apparent level position.

3. In a self erecting gyro, and in combination, an undamped two way inclinometer switch having a moveable contact element in neutral equilibrium, torque applying means for precessing the gyro to erect the same, damped means controlled by said switch for operating said torque applying means, and a follow up between said torque applying means and said switch for maintaining said switch in apparent level position.

4. A torque controlling unit for self erecting gyros comprising an inclinometer, a torque weight moveable about a neutral position, a follow-up between said torque weight and said inclinometer for maintaining said inclinometer in apparent level position, and thermo-responsive means controlled by said inclinometer for moving said torque weight, whereby tilting of said unit causes movement of said torque weight to restore said inclinometer to apparent level position.

5. A torque controlling unit for self erecting gyros comprising an inclinometer, electric heaters selectively operable by said inclinometer according to direction of apparent tilt of said gyro, opposed thermo-responsive elements respectively heated by said electric heaters, a torque weight moveable transversely of the gyro spin axis by said elements according to the net force exerted by the same, and a follow-up between said torque weight and inclinometer, whereby tilting of said unit causes movement of said torque weight to restore said inclinometer to apparent level position.

6. A torque controlling unit for self erecting gyros comprising a frame, a two way mercury switch tiltably mounted in said frame, opposed thermo-responsive bimetallic strips mounted on said frame, a torque weight carried by said strips and moveable thereby transversely of the plane of tilt of said switch, a cam means mounted on said frame for tilting said switch, and means connecting said torque weight and cam means for tilting said switch in accordance with movement of said torque weight.

7. In a self-erecting gyroscope an undamped inclinometer for taking the tilt of the gyroscope, torque applying means for precessing said gyroscope to erect the same, dampened actuating means responsive to said inclinometer for operating said torque applying means, and follow-up means between the torque applying means and said inclinometer for maintaining the same in an apparently level position.

8. A gyroscope erection system including in combination a gyroscope housing, an inclinometer carried by said housing, a precessing weight, a pair of bi-metallic means for carrying said weight, electric heating means for each of said bi-metallic means, switch means carried by said inclinometer adapted to selectively complete a circuit through one of said electric heating means agreeable to the direction of tilt of the gyroscope housing whereby to distort said bi-metallic means to move the precessing weight to precess the gyroscope to an erect position.

RICHARD F. WEHRLIN.

REFERENCES CITED

The following references are of record in the file of this patent:

UNITED STATES PATENTS

| Number | Name | Date |
|---|---|---|
| 1,773,172 | Davis | Aug. 19, 1930 |
| 2,367,465 | Kunzer | Jan. 16, 1945 |
| 2,382,993 | Haskins, Jr. | Aug. 21, 1945 |
| 2,384,838 | Kellogg, 2d | Sept. 18, 1945 |